United States Patent
Fabian et al.

(10) Patent No.: US 7,028,508 B2
(45) Date of Patent: Apr. 18, 2006

(54) METHOD FOR PRODUCING AN OPTICAL FIBER AND OPTICAL FIBER

(75) Inventors: Heinz Fabian, Grossostheim (DE); Thomas J. Miller, Naples, FL (US)

(73) Assignee: Heraeus Tenevo GmbH, Hanau (DE)

( * ) Notice: Subject to any disclaimer, the term of this patent is extended or adjusted under 35 U.S.C. 154(b) by 0 days.

(21) Appl. No.: 10/507,944

(22) PCT Filed: Mar. 6, 2003

(86) PCT No.: PCT/EP03/02271

§ 371 (c)(1),
(2), (4) Date: Sep. 14, 2004

(87) PCT Pub. No.: WO03/080522

PCT Pub. Date: Oct. 2, 2003

(65) Prior Publication Data

US 2005/0117863 A1    Jun. 2, 2005

(30) Foreign Application Priority Data

Mar. 22, 2002 (DE) ............................... 102 13 048
Mar. 27, 2002 (DE) ............................... 102 14 029

(51) Int. Cl.
*C03B 37/018* (2006.01)

(52) U.S. Cl. ............................ 65/414; 65/385; 65/391; 65/388; 65/412; 65/434; 65/435; 385/123

(58) Field of Classification Search ........ 385/123–128; 65/438–405, 413–435
See application file for complete search history.

(56) References Cited

U.S. PATENT DOCUMENTS

| | | |
|---|---|---|
| 4,820,322 A | 4/1989 | Baumgart et al. |
| 5,643,069 A | 7/1997 | Christiansen et al. |
| 5,665,132 A | 9/1997 | Ruppert et al. |
| 5,738,702 A | 4/1998 | Ruppert et al. |
| 5,785,729 A | 7/1998 | Yokokawa et al. |
| 5,788,730 A | 8/1998 | Ruppert et al. |
| 5,790,736 A | 8/1998 | Fabian |
| 5,837,024 A | 11/1998 | Fabian |
| 5,928,574 A * | 7/1999 | DiMarcello et al. ...... 65/434 X |
| 6,047,564 A | 4/2000 | Schaper et al. |
| 6,079,225 A | 6/2000 | Ruppert et al. |
| 6,098,428 A | 8/2000 | Bogdahn et al. |
| 6,152,166 A | 11/2000 | Bauscher et al. |

(Continued)

FOREIGN PATENT DOCUMENTS

EP    0 567 961 A    11/1993

(Continued)

*Primary Examiner*—Phan T. H. Palmer
(74) *Attorney, Agent, or Firm*—Tiajoloff & Kelly

(57) ABSTRACT

In the known method for producing an optical fiber, a coaxial arrangement comprising a core rod and an outer jacket tube is elongated, the coaxial arrangement being supplied in a vertical orientation to a heating zone and being softened therein zonewise, starting with the lower end thereof, and the optical fiber being withdraw downwards from the softened portion, whereby an annular gap existing between core rod and jacket tube is collapsed. Starting therefrom, in order to provided a method which makes it possible to produce optical fibers with a minimum curl and at low costs, the invention suggests that a quartz glass cylinder treated mechanically to its final dimension and having an outer diameter of at least 100 mm should be used as the jacket tube. An optical fiber obtained according to the method is characterized in that without the action of external forces it assumes a radius of curvature of at least 6 mm.

27 Claims, 1 Drawing Sheet

U.S. PATENT DOCUMENTS

| | | |
|---|---|---|
| 6,321,573 B1 | 11/2001 | Fritsche et al. |
| 6,715,317 B1 | 4/2004 | Bräuer et al. |
| 6,938,442 B1 | 9/2005 | Schmitt et al. |
| 2002/0136515 A1 | 9/2002 | Schaper et al. |

FOREIGN PATENT DOCUMENTS

| | | |
|---|---|---|
| EP | 0 598 349 A | 5/1994 |
| EP | 1 129 999 A | 9/2001 |

* cited by examiner

METHOD FOR PRODUCING AN OPTICAL FIBER AND OPTICAL FIBER

The present invention relates to a method for producing an optical fiber by elongating a coaxial arrangement, comprising a core rod and an outer jacket tube, the coaxial arrangement being fed in vertical orientation to a heating zone and being softened therein zonewise, starting with its lower end, and the optical fiber being withdrawn downwards from the softened portion, whereby an annular gap existing between core rod and jacket tube is collapsed.

Furthermore, the present invention relates to an optical fiber comprising a core and a jacket cladding the core.

The use of optical fibers for data transmission has gained economic importance in the last 20 years. After the optical fibers have first been improved with respect to their optical attenuation and fiber strength, the main emphasis is now laid on cost reduction. Possible approaches are here an increase in the transmission capacity per optical fiber and a decrease in the production costs of the optical fibers. As a rule, optical fibers have so far been produced by drawing from a preform provided across its cross section with a radial refractive index profile that is formed by a core of quartz glass with a dopant increasing the refractive index and by a jacket cladding the core and having a lower refractive index.

So-called single-mode optical fiber preforms for commercial applications are essentially produced according to the known OVD (outside vapor deposition), MCVD (modified chemical vapor deposition), PCVD (plasma chemical vapor deposition) and VAD (vapor axial deposition) methods. In these methods, a core rod is first produced which comprises the core and part of the jacket of the later single-mode optical fiber. A further quartz glass, which is designated as "jacket material", is applied to the core rod. The quality of said jacket material is of importance to the mechanical strength of the optical fiber while the effect on the optical characteristics has so far been of minor importance.

EP-A1 0 309 027 describes a method for producing an optical monomode fiber by drawing from a large-volume preform of quartz glass. The preform is produced by depositing core material on the inner wall of a substrate tube, and the substrate tube is subsequently collapsed under formation of a blank of core material, and the core material blank is then overclad according to the rod-in-tube technique. Two quartz glass tubes of different diameters are used for overcladding the core rod, the largest one having an outer diameter of 52 mm and an inner diameter of 27 mm. It is further described that the connection of core material blank and overcladding tube should be etched, washed and dried before the start of a cleaning treatment by means of plasma etching under a fluorine-containing atmosphere.

EP-A 598 349 also discloses a method for producing an optical fiber by drawing from a large-volume preform using a thick-walled quartz glass cylinder. Several methods are suggested for producing the quartz glass cylinder. The first method consists of two steps. In the first step, a cylindrical quartz glass blank is provided. In the second step, the blank is mechanically drilled for forming a central bore either by using a core drill or by subjecting the blank to a hot upsetting method to produce a bore. The second method starts from an OVD method, wherein porous $SiO_2$ soot is deposited on a heat-resistant mandrel material, the mandrel material is then removed, and the deposited soot is dehydrated and molten under vitrification. The third method comprises forming a porous soot material directly by the VAD method and subsequently vitrifying the dehydrated deposit by melting.

For reasons of costs it has become more and more customary to apply part of the jacket directly while the fiber is being drawn. During fiber drawing a jacket tube is collapsed onto a so-called core rod. An example of such a method, which also corresponds to the method of the above-mentioned type and will be designated hereinafter as "ODD method" (overclad during drawing), is described in EP A 1 129 999. It is suggested there that a core rod with an inner jacket glass tube and an outer jacket glass tube should be overclad at the same time. For fixing the core rod within the inner and outer jacket glass tube, the outer jacket glass tube is provided in the area of the lower end with a constriction. With the outer jacket tube being vertically oriented, a holding ring is introduced from above into the inner bore of the jacket tube, the latter having an outer diameter slightly larger than the diameter of the constriction, so that the holding ring comes to rest from above on the area of the constriction. With an exactly horizontal orientation, and due to the central bore of the holding ring, this yields a stop for the core rod provided with a conical lower end while the first inner jacket tube rests on the holding ring. Subsequently, the coaxial arrangement of jacket tubes and core rod is supplied in a vertical orientation to a furnace and softened therein zonewise with the members being molten with one another and a vacuum being produced and maintained in the inner bore of the outer jacket tube.

An important parameter for the assessment of the fiber quality is the fiber bow or "fiber curl" assumed by a freely movable fiber without the action of forces. The fiber curl is created by deviations from the ideal cylinder symmetry, either in the preform or in a coaxial arrangement of components according to the ODD method. In particular a bending already created in the preform or in the components used in the ODD method has an effect on the fiber curl because during fiber drawing an exact positioning in the center of the furnace and thus a homogeneous and cylindrically symmetrical temperature distribution around the component to be drawn are rendered difficult. For high-quality optical fibers a radius of curvature ("fiber curl") of about 4 m is allowed at present. With the above-described methods, such a condition can only be satisfied by taking utmost care during production of the components and by an extremely accurate positioning in the drawing furnace. However, it would be desirable to further reduce the fiber curl, especially since the fiber curl renders the splicing of fibers more difficult, above all of fiber bundles or fiber ribbons.

It is therefore the object of the present invention to indicate a method which permits an inexpensive production of optical fibers with a minimum curl.

It is also the object of the present invention to indicate an optical fiber which is characterized by an easy processing, in particular during the formation of fiber splices.

As for the method, this object starting from the above-mentioned method is achieved according to the invention in that a quartz glass cylinder which is mechanically treated to its final dimension and has an outer diameter of at least 100 mm is used as the jacket tube.

Figure 1:
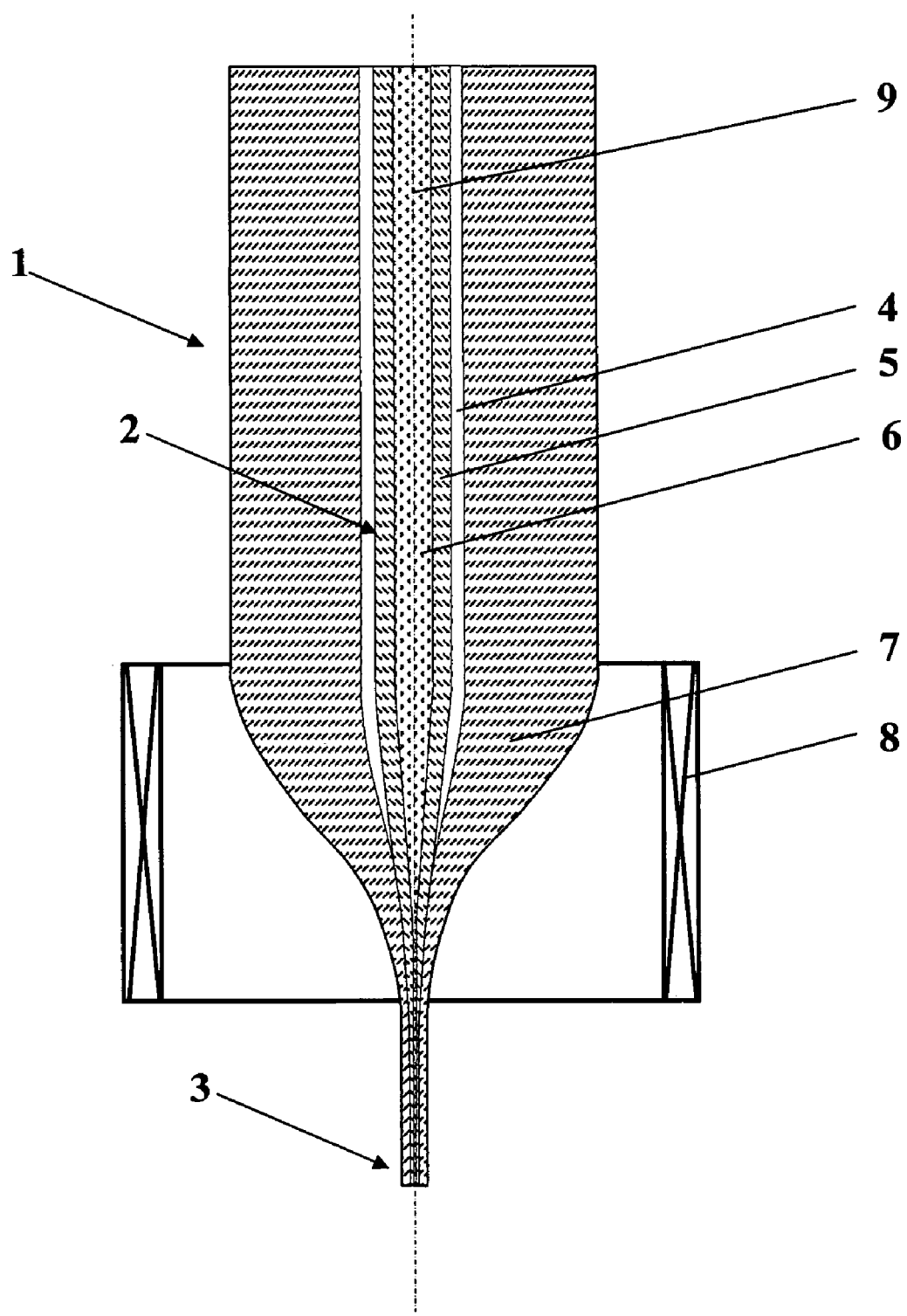
FIG. 1 is an illustration, not drawn to scale, of an optical fiber being produced in accordance with one embodiment of the present invention.

The method according to the invention is characterized by three essential aspects:
1. On the one hand, a quartz glass cylinder which is mechanically treated to its final dimension is used as the jacket tube. This constitutes an essential difference with respect to both the formerly known ODD methods and the formerly known drawing methods using a preform.

So far so-called jacket tubes have been used in the ODD method for overcladding the core tube. Inner diameter and outer diameter of the used jacket tubes are adapted to the used core rod and to the fiber to be produced.

The geometry is adapted to the intended use in a vertical drawing process in which quartz glass cylinders with dimensions standardized by the works are elongated to the necessary jacket tube dimensions. In this vertical drawing process, like in any other hot forming process, the geometrical dimensional accuracy is bound to deteriorate in comparison with the quartz glass cylinders used, for the latter can be worked by mechanical treatment, such as drilling, honing and grinding, to have a high dimensional accuracy within the range of 1/100 mm.

It has been found that hot forming processes, in particular also the vertical drawing process for producing jacket tubes, effect a bending of the withdrawn component even in the case of minimum deviations from ideal, cylinder-symmetrical drawing conditions. An additional bow caused by a hot forming process is avoided by the inventive use of a cylinder mechanically treated to its final dimension.

EP-A 598 349 also suggests the use of a quartz glass cylinder of high geometrical precision that has been treated mechanically to its final dimension. However, the document does not suggest such a use for producing an optical fiber directly therefrom by elongation, but for producing a preform for optical fibers. Astonishingly, however, this method does also not bring about the desired dimensional accuracy and small curl of the fiber. The reason is that the geometrically precise quartz glass cylinder is collapsed in an intermediate step onto the core rod to obtain a preform from which the optical fiber is then drawn. As described above for the vertical drawing process, the hot forming step of collapsing the quartz glass cylinder onto the core rod effects, however, a bending of the component produced in this way, i.e. here of the preform. Bows are bound to be created by any geometrical tolerance of the drawing device and by deviations from the drawing axis. With an axially fixed drawing device, high forces are transmitted in the case of bows of the glass strand by lever action into the area of the drawing bulb and these may create a further deformation, so that the "reaction" of the drawn part of the preform into the drawing bulb "enhances" an already existing bow. At any rate, a bent preform effects a radially inhomogeneous temperature distribution in the fiber drawing furnace during fiber drawing, and said inhomogeneous temperature distribution, in turn, enhances the curl of the fiber. Likewise, an already existing dimensional deviation in the wall thickness of a jacket tube is even increased by a heat and drawing treatment, whereby the deviation is increased.

These drawbacks are avoided in the method according to the invention by the measures that use is made of a quartz glass cylinder which is mechanically treated to its final dimension and obtained by mechanical grinding from a quartz glass blank, and not of a jacket tube obtained by elongation, or of a preform. By mechanical treatment (in particular drilling, honing and grinding), and by using known honing and grinding methods and commercial devices suited therefor, it is possible to process a quartz glass blank with an outer diameter of more than 100 mm and a length of 2 m and more, fully into a straight cylinder with an accurate circular cross-section and a small dimensional deviation in the range of 1/100 mm.

A cylinder mechanically treated to its final dimension in the sense of this invention means also a cylinder the surface of which is purified and smoothed in a subsequent chemical treatment (by etching) or by fire-polishing, for etching processes and fire-polishing do not affect the bow of the quartz glass cylinder. In view of their dimensions and the mechanical treatment the quartz glass cylinders known from EP-A 598 349 are suitable to be used in the method of the present invention under the condition that the outer diameter is at least 100 mm. Insofar this document is incorporated hereby by reference.

2. The second essential aspect of the invention resides in the fact that a quartz glass cylinder is used with an outer diameter of at least 100 mm. In comparison with the use of "jacket tubes", the use of large-volume quartz glass cylinders yields two essential advantages, namely a cost advantage and an improvement of the dimensional accuracy.

The cost advantage is due to the larger volume and the resulting longer fiber length obtained in a fiber drawing process, so that an inexpensive mass production can be realized.

The improvement as to dimensional accuracy is due to the fact that deviations of the quartz glass cylinder from the ideal cylinder symmetry during fiber drawing are scaled down accurately to the smaller fiber diameter and are thus less noticed than in the case of a smaller true-to-scale reduction, e.g. on the basis of a known jacket tube having a smaller outer diameter.

Geometrical flaws remaining after mechanical treatment are defined by the accuracy of the tools and the technical measuring limits of the procedure. These "remaining flaws" can be minimized in their impact when the quartz glass cylinder has a wall thickness that is as large as possible. Due to down-scaling the relative flaw resulting in the fiber becomes smaller.

3. A further essential aspect of the invention must be seen in the fact that the large-volume quartz glass cylinders as used are capable of compensating for the poor dimensional accuracy of the core rod, which is often due to the production process. The core rod is automatically produced in a hot process and thus always deviates to some extent from the ideal geometry. A mechanical treatment of the core rod at a later time would just lead to a change in the ratio of jacket and core material and thus to contamination and does therefore not make any sense. The effect of the geometrical flaws of the core rod can be minimized by providing the quartz glass cylinder with a wall that is as thick as possible, whereby the relative flaw contribution of the core rod is reduced.

In the method according to the invention it is possible to overclad the core rod with further jacket tubes in addition to the quartz glass cylinders mechanically treated to their final dimensions; for the above-described reasons these are preferably jacket tubes which have been treated mechanically to their final dimensions.

Advantageous developments of the invention follow from the subclaims.

The greater the outer diameter of the quartz glass cylinder is and the smaller the inner diameter, the larger is the quartz glass volume provided by the quartz glass cylinder and the greater is the advantage of the method with respect to the production costs based on the fiber kilometers and with respect to the dimensional accuracy of the fibers obtained therefrom.

The wall thickness of the quartz glass cylinder also plays an important role. Preferably, use is made of a quartz glass cylinder and a core rod, wherein the ratio $CSA_{(C)}/CSA_{(R)}$ of the radial cross-sectional area $CSA_{(C)}$ of the quartz glass cylinder and the radial cross-sectional area $CSA_{(R)}$ of the core rod is in the range between 5 and 100, preferably between 10 and 80. The greater the wall thickness of the quartz glass cylinder is, the more precise will be the manufacture of an optical fiber because with an increasing wall thickness of the cylinder absolute geometrical flaws (which are independent of the wall thickness and the outer diameter of the quartz glass cylinder) are down-scaled to a greater extent during fiber drawing. The outer diameter of the quartz glass cylinder is at least 100 mm.

The method according to the invention permits the use of quartz glass cylinders having a length of at least 2 m, preferably a length of at least 3 m. The use of a quartz glass cylinder with a maximum length, which has an advantageous effect on the economy of the method, is only made possible by the mechanical final treatment, for in quartz glass tubes that are not mechanically finished, but have obtained their final dimensions by a hot forming step, a certain deflection is always observed. This makes it more difficult to insert a core rod, so that at the same outer diameter of the core rod an increasing length of the tube requires an increased inner diameter to take into account the existing deflection. Hence, the length of the cylinder entails an increase in the width of the gap between core rod and inner wall of the tube, which results in geometrical deviations during collapsing of the tube. In this respect the method according to the invention also improves the dimensional accuracy in the case of particularly long quartz glass cylinders.

The used quartz glass cylinders have preferably a bow of not more than 0.3 mm per length meter, preferably a bow of not more than 0.1 mm per length meter, and particularly preferably a bow of not more than 0.05 mm per length meter. Their wall thickness deviation is not more than 0.3 mm per length meter; preferably, the wall thickness deviation is not more than 0.1 mm per length meter, and particularly preferably not more than 0.05 mm per length meter. The ovality of the quartz glass cylinder is not more than 0.3 mm per length meter, preferably not more than 0.1 mm per length meter and, particularly preferably, ovality is not more than 0.05 mm per length meter.

The used quartz glass cylinder is preferably made from a porous soot material. Porous soot material permits subsequent purification, dehydration and doping, so that glass characteristics, such as the OH-group concentration and the refractive index, can be set and adapted to the demands made on the core rod to be used.

It has been found to be of particular advantage when the quartz glass cylinder is produced according to the so-called OVD method. This outside deposition method yields a tubular body which due to the production process has an exact inner bore which after vitrification just requires a small mechanical finishing step.

It has been found of particular advantage when the width of the annular gap between the core rod and the outer jacket tube is less than 0,6 mm, preferably less than 0,3 mm.

It was found that the gap size between the core rod and the outer jacket tube is a critical parameter in view of an exact fiber geometry. The smaller the gap between the better the fiber geometry. This can be understood by the reduced shrinkage distance during the collapsing of the jacket tube onto the core rod. This shrinkage is a very limited but still important material flow which may result in geometry errors. Therefore it is beneficial to reduce this effect as much as possible by limiting the gap size.

On the other hand it may also be advantageous to establish a large gap size. In a preferred embodiment of the method the width of the annular gap is larger than 2 mm, preferably larger than 5 mm, and especially preferred larger than 10 mm. The larger the gap between core rod and cylinder the better the interface quality generated during the collapsing step. This can be understood by the larger shrinkage distance during the collapsing of the cylinder onto the core rod. This larger distance results in a longer heating time before the surfaces of the mechanically treated cylinder and the core rod touch. This intense heating ensures that the imperfections of the machined surfaced are thoroughly molten and this way the surface becomes more smooth. The smoother and softer the surfaces before touching each other the better the interface quality. Therefore it is beneficial for interface quality to support this effect by increasing the gap size.

As for the optical fiber, the above-indicated technical object is achieved according to the invention by the feature that without the action of forces the fiber assumes a radius of curvature of at least 6 m.

A fiber which—in case of a free curvature, i.e. without the action of external forces on the fiber—shows a radius of curvature of 6 m and more, simplifies, in particular, the production of splices. The production of such a fiber takes place in accordance with the above-described method.

The invention shall now be explained in more detail with reference to an embodiment.

Optical fibers were produced according to the ODD method by overcladding a core rod with a quartz glass cylinder during fiber drawing. The fibers have a core region which is surrounded by an inner jacket glass layer and an outer jacket glass layer. The core region consists of quartz glass homogeneously doped with 5% by wt. of germanium dioxide. The jacket glass layers consist of undoped quartz glass, of which a part is provided by the jacket of the core rod and a part by a mechanically treated quartz glass cylinder.

EXAMPLE 1

In the following, the production of the quartz glass cylinder will first of all be explained in more detail with reference to a first embodiment, as illustrated in FIG. 1.

In accordance with the VAD method, a large-volume porous soot body was produced by means of flame hydrolysis of $SiCl_4$ in an oxyhydrogen gas burner and by deposition of the formed $SiO_2$ soot particles on a rotating quartz rod. The soot body was dehydrated in a gas mixture of He and $Cl_2$ and then vitrified in a zone melting process at 1550° C. A large cylindrical quartz glass block was thereby obtained.

The outer surface of the quartz glass block was ground by means of a peripheral grinder with a #80 grinding stone to the desired outer dimension, and the inner portion of the quartz glass block was subsequently bored by means of a core drill, which was also equipped with a #80 grinding stone. A tube of synthetic quartz glass was thereby obtained.

For the purpose of high-precision finishing the inner wall of the tube was reworked with a honing machine, resulting in a straight bore extending in the longitudinal axial direction and having an exactly circular cross-section. The tube was polished, the finishing operation being carried out by a grinding means of the fineness degree #800. The outer portions of the tube were then ground by using an NC peripheral grinder in such a way that the central axis 9 of the outer diameter coincided with that of the inner diameter. After it had been ensured that the cylinder was machined to the desired wall thickness with a tolerance of 2%, the outer portions were finished with #140. The tube was then etched in a hydrofluoric acid bath having a concentration between 5% and 30% so as to reduce surface tensions and to remove damage caused by the surface treatment.

The pretreated cylinder obtained in this way (sample 1 in Table 1) had an outer diameter of 120 mm, an inner diameter of 16 mm and a length of 2500 mm. The dimensional deviation A in the wall thickness ($D_{max}-D_{min}$) was 0.05 mm at the most, the bow was less than 0.05 mm/length diameter, and not more than 0.04 mm was measured for ovality. Furthermore, the surface was examined as to roughness by guiding a roughness metering device over a distance of 8 mm in the direction of the longitudinal axis, and a value $R_{max}$ of 4.8 µm was found for the inner surface and of 53 µm for the outer surface.

Moreover, a so-called core rod 2 was produced according to the OVD method. To this end, soot particles were deposited layerwise on a carrier rotating about its longitudinal axis by reciprocating a deposition burner, with $SiCl_4$ and $GeCl_4$ being fed to the deposition burner and hydrolyzed in a burner flame in the presence of oxygen to obtain $SiO_2$ and $GeO_2$. The ratio of $SiCl_4$ and $GeCl_4$ was set during deposition of the inner layers in such a way that a predetermined homogeneous $GeO_2$ concentration of 5 mol % was obtained over said part of the wall thickness of the soot tube. As soon as the soot layers had been deposited that formed the core region 5 of the core rod 2 the supply of $GeCl_4$ to the deposition burner was stopped, and a first inner jacket 6 glass layer of undoped $SiO_2$ was deposited on the core region 5.

After completion of the deposition method and removal of the carrier a soot tube was obtained that was subjected to a dehydration treatment for removing the hydroxyl groups introduced by the production process. To this end the soot tube was introduced in vertical orientation into a dehydration furnace and first treated at a temperature ranging from 800° C. to about 1000° C. in a chlorine-containing atmosphere. The treatment lasted for about six hours. This yielded a hydroxyl group concentration of less than 100 ppb by wt. The soot tube treated in this way was vitrified in a vitrification furnace at a temperature in the range of about 1350° C. and the inner bore was collapsed in this process, resulting in a core rod 2 of the desired refractive index profile. Two core rods were thereby produced with an outer diameter and a core diameter as can be gathered from Table 1 (sample no. 1 and sample no. 2).

The core rods had a homogeneous OH content of 0.004 ppm by wt. across the radial cross-section.

In the optical fiber 3 to be produced with an outer diameter of 125 µm, each of the core rods according to Table 1 forms a core region 5 having a diameter of about 8.5 µm.

TABLE 1

| | Quartz glass cylinder | | | | | Core rod | |
|---|---|---|---|---|---|---|---|
| Sample No. | outer Φ (mm) | Inner Φ (mm) | bow [mm/m] | ovality [mm] | ΔD [mm] | Outer Φ (mm) | core Φ (mm) |
| 1 | 120 | 16 | 0.05 | 0.04 | 0.05 | 14.0 | 8.3 |
| 2 | 150 | 22 | 0.06 | 0.05 | 0.06 | 20.0 | 10.3 |
| 3 | 200 | 50 | 0.08 | 0.07 | 0.07 | 48.0 | 13.8 |
| 4 | 180 | 60 | 0.07 | 0.06 | 0.08 | 58.0 | 12.4 |
| 6 | 150 | 22 | 0.06 | 0.05 | 0.06 | 21.5 | 10.3 |
| 7 | 150 | 52 | 0.06 | 0.05 | 0.06 | 26.0 | 10.3 |
| 8 | 120 | 45 | 0.06 | 0.05 | 0.06 | 24.0 | 10.3 |

Further jacket material for forming outer jacket 1 glass layers of the fiber 3 were provided according to the invention in the form of a quartz glass cylinder which, however, was only collapsed onto the core rod 2 during fiber drawing in an ODD method.

For producing a fiber 3 the core glass rod (length: 2450 mm) was inserted into the quartz glass cylinder and fixed therein such that its central axis 9 coincided with that of the cylinder. The two ends of the resulting composite structure were connected to a quartz glass holder, and the composite structure was introduced from the upper side into a vertically oriented and electrically heated fiber drawing furnace with a heating zone 8, and softened zonewise, starting with the lower end, at a temperature around 2180° C., and a fiber 3 having an outer diameter of 125 µm was drawn from the softened area 7. In this process a negative pressure ranging between 200 mm and 100 mmAq was maintained in the gap 4 of about 1 mm that remained between core rod 2 and quartz glass cylinder. Special attention was paid that the composite was exactly centered in the center of the furnace and that a cylindrically symmetrical temperature distribution was obtained within the drawing furnace.

The optical fiber 3 obtained thereby with a diameter of 125 µm turned out to be a high-quality fiber with which it was possible to achieve a cut-off wavelength IC of 1.245 µm, an optical attenuation of 0.3 34 dB/km at a wavelength of 1.3 µm, and a core eccentricity of 0.12 µm. Moreover, it showed a small fiber curl at a radius of 5.5 m.

EXAMPLE 2

A large porous soot body was produced by outside deposition with the help of a standard OVD method by analogy with the above-described production of the core rod, but without addition of a dopant. After removal of the carrier a soot tube was obtained that was subjected to the above-described dehydration treatment and then vitrified. The two end portions of the tubular quartz glass blank produced in this way from synthetic quartz glass were cut off, and the outer wall was coarsely ground by means of a peripheral grinder equipped with a #80 grinding stone, whereby the predetermined desired outer diameter was substantially obtained. The inner surface of the resulting tube was polished on the whole by means of a honing machine equipped with a #80 grinding stone. The degree of polishing was continuously improved by exchanging the grinding stones, the final treatment being carried out with a #800 grinding stone.

Thereupon, the tube treated in this way was checked for differences in the wall thickness by guiding an ultrasonic thickness metering device over a path of 50 mm in the direction of the longitudinal axis, resulting in eight measuring points distributed over the circumference. The outer surface of the tube was then ground by means of an NC peripheral grinder. After it had been ensured that the tube was manufactured with a wall thickness within a predetermined tolerance range, the tube was etched in a hydrofluoric acid-containing etching solution for a short period of time.

This yielded a large-volume cylinder of synthetic quartz glass with an outer diameter of 150 mm and an inner diameter of 22 mm with a maximum deviation in the wall thickness Δ of 60 μm. The bow was less than 0.06 mm/length meter, and not more than 0.05 mm was measured for ovality. It became apparent that the surface roughness $R_{max}$ of this pretreated tube was 3.5 μm for the inner surface, and 77 μm for the outer surface (sample no. 2 in Table 1).

The core rod according to sample no. 2 of Table 1 was inserted into the resulting quartz glass cylinder and fixed therein. The core rod had a length of 2450 mm. The resulting composite structure was then heated in a vertically oriented and electrically heated fiber drawing furnace to a temperature ranging between 2000° C. and 2400° C., the composite being molten from the lower end and softened and an optical fiber being withdrawn from the softened area with an outer diameter of 125 μm±0.5 μm. A vacuum ranging between 200 mm and 1000 mmAq was obtained in the annular gap between core rod and quartz glass cylinder (1 mm).

The optical fiber obtained in this way turned out to be a high-quality fiber with an eccentricity of the fiber core at not more than 0.11 μm, a cut-off wavelength $I_C$ of 1.270 μm, an optical attenuation of 0.338 dB/km at a wavelength of 1.3 μm, the attenuation by OH groups at a wavelength of 1.38 μm being at 0.65 dB/km. Moreover, it showed a small fiber curl at a radius of 6.1 m.

EXAMPLE 3

A large porous soot body which had been produced by outside deposition from the vapor phase (OVD) was produced in the same way as in Example 2, dehydrated, subjected to a treatment for adjusting the refractive index and vitrified, resulting in a cylinder of synthetic quartz glass. The inner and outer wall of the resulting quartz glass cylinder was ground mechanically, as explained above with reference to Example 1.

The inner diameter of the resulting cylinder was machined by means of a high-precision honing machine to a value of 50 mm, and the outer wall was ground to an outer diameter of 200 mm (sample no. 3 in Table 1). The wall thickness of the resulting large-volume cylinder of quartz glass showed a maximum deviation of 0.07 mm over the whole length of 3500 mm. The bow was less than 0.08 mm/length meter and not more than 0.07 mm was measured for ovality. It turned out that the surface roughness $R_{max}$ of this pretreated tube was 3.5 μm for the inner surface and 77 μm for the outer surface.

Furthermore, a core rod was produced according to the method described in Example 1 (outer diameter=20 mm). To add additional jacket material up to an outer diameter of 48 mm to said core rod, a jacket tube was collapsed onto the core rod. The jacket tube was produced by flame hydrolysis of $SiCl_4$ under formation of $SiO_2$ particles and axial deposition of the $SiO_2$ particles on a rotating mandrel. Prior to sintering the jacket tube consisting of undoped porous quartz glass was dried in a chlorine-containing atmosphere. After sintering the jacket tube had an inner diameter of about 22 mm and an outer diameter of about 49 mm, and it had a mean OH content of 0.05 ppm by wt., which was homogeneous over the wall thickness of the jacket tube. Subsequently, the jacket tube was mechanically treated to its final dimension and then collapsed onto the core rod. To this end the core rod was arranged coaxially within the jacket tube, and the surfaces defining the annular gap between core rod and jacket tube were purified and dehydrated in a chlorine-containing atmosphere at a temperature of about 1000° C. Subsequently, the jacket tube was molten onto the core rod by the arrangement being heated zonewise in an electrically heated-furnace to a temperature of 2150° C. (furnace temperature), so that a core rod was obtained with the dimensions indicated in Table 1 for sample No. 3.

After collapsing the jacket tube forms a second outer jacket glass layer on the core rod. The quartz glass rod obtained in this way represents the fiber core in the later optical fiber, as well as the jacket contributing to light guidance (the so-called "optical cladding"). The core glass zone is surrounded by a jacket of undoped quartz glass having a refractive index "$n_{M1}$" of typically 1.4585. The jacket is formed by the inner jacket glass layer and the outer jacket glass layer.

The core rod produced in this way with a length of 3.3 m was inserted into and fixed in the quartz glass cylinder according to sample no. 3 of Table 1. The resulting composite structure was then heated in a vertically oriented and electrically heated fiber drawing furnace to a temperature ranging between 2000° C. and 2400° C., the composite being molten from the lower end and softened, and an optical fiber being drawn from the softened area with an outer diameter of 125 μm±0.5 μm. A vacuum ranging between 200 mmAq and 1000 mmAq was maintained in the annular gap between core rod and quartz glass cylinder (1 mm).

The optical fiber obtained in this way turned out to be a high-quality fiber with an eccentricity of the fiber core at not more than 0.10 μm, a cut-off wavelength $I_C$ of 1.270 μm, an optical attenuation of 0.334 dB/km at a wavelength of 1.3 μm. Moreover, it showed a small fiber curl at a radius of 6.2 m.

EXAMPLE 4

In a modification of the procedure described in Example 3 (while maintaining the geometrical dimensions indicated therein), the jacket tube that had been treated mechanically to its final dimension and smoothed on the surface was not collapsed onto the core rod in a separate step of the method, but was directly drawn into an optical fiber in coaxial arrangement with the cylinder and the core rod in an ODD process.

The resulting optical fiber turned out to be a fiber of a particularly high quality with an eccentricity of the fiber core at not more than 0.08 μm, a cut-off wavelength $I_C$ of 1.270 μm, an optical attenuation of 0.330 dB/km at a wavelength of 1.3 μm. Moreover, it showed a particularly small fiber curl at a radius of 6.8 m.

EXAMPLE 5

Produced was a large-volume porous soot body according to the method according to Example 3 and with the dimensions indicated in Table 1 for sample no. 4. The inner and outer wall of the quartz glass cylinder was ground mechanically, as explained above with reference to Example 1.

The wall thickness of the resulting large-volume cylinder of quartz glass showed a maximum deviation of 0.08 mm over the whole length of 3000 mm. The bow was less than 0.07 mm/length meter, and not more than 0.06 mm was measured for ovality.

Furthermore, a core rod was produced in accordance with the method described in Example 1 with an outer diameter of 58 mm and a core diameter of 12.4 mm and a length of 2.9 m, and inserted into and fixed in the quartz glass cylinder according to sample no. 4 of Table 1.

The resulting composite structure was then heated in a vertically oriented and electrically heated fiber drawing furnace to a temperature ranging between 2000° C. and 2400° C., the structure being molten from the lower end and softened, and an optical fiber being drawn from the softened area with an outer diameter of 125 µm±0.5 µm.

The resulting optical fiber turned out to be a high-quality fiber with an eccentricity of the fiber core at not more than 0.10 µm, a cut-off wavelength $I_C$ of 1.270 µm, an optical attenuation of 0.334 dB/km at a wavelength of 1.3 µm. Moreover, it showed a small fiber curl at a radius of 6.0 m.

EXAMPLE 6

A quartz glass cylinder was produced and treated according to Example 2 (sample no. 5 in Table 1).

A core rod according to sample no. 5 of Table 1 having a length of 2450 mm and an outer diameter of 20,9 mm was produced which fits nearly perfect into the bore of the quartz glass cylinder.

The core rod was inserted into the quartz glass cylinder and fixed therein. The annular gap between core rod and quartz glass cylinder is less than 0.6 in this case. The resulting composite structure was then heated in a vertically oriented and electrically heated fiber drawing furnace and a fiber was drawn as it is described above for Example 2.

The optical fiber obtained in this way turned out to be a high-quality fiber with an eccentricity of the fiber core at not more than 0.06 µm, a cut-off wavelength $I_C$ of 1.270 µm, an optical attenuation of 0.338 dB/km at a wavelength of 1.3 µm, the attenuation by OH groups at a wavelength of 1.38 µm being at 0.65 dB/km. Moreover, it showed a small fiber curl at a radius of 7.0 m.

EXAMPLE 7

A quartz glass cylinder was produced and treated according to Example 2 resulting in an cylinder according to sample no. 6 in Table 1.

A special core rod was produced having a length of 2450 mm and an outer diameter of 21.5 mm which fits nearly perfect into the bore of the quartz glass cylinder (sample no. 6 of Table 1).

To obtain the very precise geometry of the core rod required for small gap sizes a mechanical processing of the core rod was necessary. Such a mechanical processing could adversely affect the diameter relation between core and cladding material and therefore it should be kept at a low level and only diameter variations should be eliminated. In this case the core rod was produced with an initial diameter up to of 24 mm.

It was then precision ground to a diameter of 21.8 mm and finally plasma flame polished to obtain a very smooth surface quality without OH impurities and in order to reduce the core rod diameter to its final diameter of 21.5 mm. By the precision grinding step it can be assured that all geometry errors which usually occur on standard core rods (MCVD, VAD, or OVD) are corrected.

The core rod was inserted into the quartz glass cylinder and fixed therein. The annular gap between core rod and quartz glass cylinder is less than 0.3 in this case. The resulting composite structure was then heated in a vertically oriented and electrically heated fiber drawing furnace and a fiber was drawn as it is described above for Example 2.

The optical fiber obtained in this way turned out to be a high-quality fiber with an eccentricity of the fiber core at not more than 0.04 µm, a cut-off wavelength $I_C$ of 1270 µm, an optical attenuation of 0.338 dB/km at a wavelength of 1.3 µm, the attenuation by OH groups at a wavelength of 1.38 µm being at 0.65 dB/km. Moreover, it showed a small fiber curl at a radius of 8.5 m.

EXAMPLE 8 AND 9

In order to further improve fiber quality experiments concerning the gap size between core rod and cylinder were performed and is was found that the gap size is a very critical parameter. The larger the gap width between core rod and cylinder the better the interface quality generated during the collapsing step.

Therefore, quartz glass cylinders were produced and treated according to method described in Example 2 resulting in two hollow cylinders having dimensions given in Table 1 for sample 6 respectively sample 7. The inner diameter of the cylinders was 52 mm respectively 45 mm.

The core rod for sample 7 was produced having a length of 2450 mm and an outer diameter of 26.0 mm. The core rod for sample 8 has an outer diameter of 24.0 mm.

Each of the core rods was inserted into the quartz glass cylinder as mentioned above and fixed therein. The annular gap width between the inner lining of the cylinder and the outer surface of the core rod was about 13 mm (sample no. 7 of Table 1) respectively 10.5 mm (sample no. 8 of Table 1). The resulting composite structure was then heated in a vertically oriented and electrically heated fiber drawing furnace and a fiber was drawn as it is described above for Example 2.

The large annular gap between the cylinder and core rod results in larger shrinkage distance and therefore in a longer collapsing time before the surfaces of the mechanically treated cylinder and the core rod touch each other. This intense heating ensures that the imperfections of the machined surfaced are thoroughly molten and this way the surface becomes very smooth.

In order to evaluate the effect of longer heating time and smoothing of the surfaces, the core rod of sample 8 was subjected to a polishing treatment using grinding means of the fineness degree #800 before inserting into the quartz glass cylinder. This treatment of the core rod has the additional advantage that geometry errors which usually occur on standard core rods are corrected.

The optical fibers obtained in this way turned out to be high-quality fibers. The optical and mechanical properties of the fibers are similar to those reported for the fiber of Example 6. The fibers were additionally tested and analysed with respect to interface breaks and air lines. In both cases no such defects could be detected. Details regarding the methods and apparatuses of relevance to the present invention for the production of synthetic quartz glass for optical fibers by OVD can be gathered from the following publications: U.S. Pat. No. 5,788,730 describes a method and a deposition burner of quartz glass with a central nozzle and at least three ring-shaped nozzles for producing a soot body with a homogeneous radial density distribution; DE-A1 197 25 955 teaches the use of a burner for feeding liquid glass start material; and DE-A1 195 01 733 discloses an apparatus for the simultaneous and uniform supply of gas to a plurality of deposition burners using a pressure compensating vessel. For enhancing the efficiency of soot deposition, DE-A1 196

29 170 suggests the application of an electrostatic field between deposition burner and soot body; DE-A1 196 28 958 and DE-A1 198 27 945 indicate measures for homogenizing soot deposition by using an oscillatingly moved burner array. Methods and apparatuses for handling the soot body during and after the deposition process are known from DE-A1 197 51 919 and DE-A1 196 49 935; and measures for holding the soot body during vitrification follow from U.S. Pat. No. 5,665,132, U.S. Pat. No. 5,738,702 and DE-A1 197 36 949. The doping of quartz glass with fluorine and boron is described in EP-A 582 070; U.S. Pat. No. 5,790,736 imparts the teaching to adapt the viscosity of core and jacket material of a fiber, and DE 198 52 704 is concerned with a method for producing an optical fiber using doped substrate tubes according to the MCVD method. The aftertreatment of a vitrified quartz-glass hollow cylinder by using a special drill is described in U.S. Pat. No. 5,643,069. U.S. Pat. No. 5,785,729 teaches the production of large-volume preforms using the rod-in-tube technique; and DE-A1 199 15 509 describes a draw-off device suited for performing said technique. EP-A1 767 149 and DE-A1 196 29 169 relate to the production of dimensionally accurate quartz-glass tubes by a vertical drawing method.

The invention claimed is:

1. A method for producing an optical fiber by elongating a coaxial arrangement comprising a core rod and an outer jacket tube, said method comprising: supplying said coaxial arrangement being in a vertical orientation to a heating zone, said coaxial arrangement being softened therein zonewise, starting with a lower end thereof, to form a softened portion, and withdrawing said optical fiber being downwards from the softened portion, whereby an annular gap defined between the core rod and the outer jacket tube is collapsed, wherein the outer jacket tube comprises a quartz glass cylinder treated mechanically to give said cylinder a final dimension with an outer diameter of at least 100 mm.

2. The method according to claim 1, wherein the annular gap has a width that is larger than 2 mm.

3. The method according to claim 2, wherein the width of the annular gap is larger than 5 mm.

4. The method according to claim 2, wherein the width of the annular gap is larger than 10 mm.

5. The method according to claim 1, wherein the outer diameter of the quartz glass cylinder is at least 150 mm.

6. The method according to claim 5, wherein the quartz glass cylinder has an inner diameter of not more than 70 mm.

7. The method according to claim 1, wherein the annular gap has a width that is smaller than 0.6 mm.

8. The method according to claim 7, wherein the width of the annular gap is smaller than 0.3 mm.

9. The method according to claim 1, wherein the quartz glass cylinder is used with an ovality of not more than 0.3 mm.

10. The method according to claim 1, wherein the quartz glass cylinder is produced according to the OVD method.

11. The method according to claim 1, wherein the quartz glass cylinder has an inner diameter of not more than 70 mm.

12. The method according to claim 1, wherein the quartz glass cylinder has an inner diameter of not more than 40 mm.

13. The method according to claim 1, wherein the quartz glass cylinder has a radial cross-sectional area $CSA_{(C)}$ and the core rod has a radial cross-sectional area $CSA_{(R)}$, wherein a ratio $CSA_{(C)}/CSA_{(R)}$ of the radial cross-sectional area $CSA_{(C)}$ of the quartz glass cylinder and the radial cross-sectional area $CSA_{(R)}$ of the core rod is in a range between 5 and 100.

14. The method according to claim 1, wherein the quartz glass cylinder has a length of at least 2 m.

15. The method according to claim 1, wherein the quartz glass cylinder has a bow of not more than 0.3 mm per length meter.

16. The method according to claim 1, wherein the quartz glass cylinder has a wall thickness deviation of not more than 0.3 mm.

17. The method according to claim 1, wherein the outer diameter of the quartz glass cylinder is at least 200 mm.

18. The method according to claim 1, wherein the quartz glass cylinder is used with an ovality of not more than 0.05 mm.

19. The method according to claim 1, wherein the quartz glass cylinder has an inner diameter of not more than 50 mm.

20. The method according to claim 1, wherein the quartz glass cylinder has an inner diameter of not more than 30 mm.

21. The method according to claim 1, wherein the quartz glass cylinder has a radial cross-sectional area $CSA_{(C)}$ and the core rod has a radial cross-sectional area $CSA_{(R)}$, wherein a ratio $CSA_{(C)}/CSA_{(R)}$ of the radial cross-sectional area $CSA_{(C)}$ of the quartz glass cylinder and the radial cross-sectional area $CSA_{(R)}$ of the core rod is in a range between 10 and 80.

22. The method according to claim 1, wherein the quartz glass cylinder has a length of at least 3 m.

23. The method according to claim 1, wherein the quartz glass cylinder has a bow of not more than 0.1 mm per length meter.

24. The method according to claim 1, wherein the quartz glass cylinder has a bow of not more than 0.05 mm per length meter.

25. The method according to claim 1, wherein the quartz glass cylinder has a wall thickness deviation of not more than 0.1 mm.

26. The method according to claim 1, wherein the quartz glass cylinder has a wall thickness deviation of not more than 0.05 mm.

27. The method according to claim 1, wherein the quartz glass cylinder is used with an ovality of not more than 0.1 mm.

* * * * *